United States Patent [19]

Sluma et al.

[11] Patent Number: 5,246,582
[45] Date of Patent: Sep. 21, 1993

[54] SYNTHETIC HYDROPHILIC MEMBRANES AND METHOD FOR THEIR MANUFACTURE

[75] Inventors: Heinz-Dieter Sluma, Grossostheim; Jurgen Passlack, Ennepetal; Brigitte Buttner, Grunmorsbach; Marion Scherf, Kleinwallstadt, all of Fed. Rep. of Germany

[73] Assignee: Akzo N.V., Arnhem, Netherlands

[21] Appl. No.: 868,965

[22] Filed: Apr. 16, 1992

[30] Foreign Application Priority Data

Apr. 17, 1991 [DE] Fed. Rep. of Germany ....... 4112508

[51] Int. Cl.$^5$ .............................................. B01D 71/68
[52] U.S. Cl. ......................... 210/500.23; 210/500.41; 264/41; 264/DIG. 48; 264/DIG. 62
[58] Field of Search ...................... 210/500.27, 500.23, 210/500.41; 264/41, 45.1, DIG. 48, DIG. 62

[56] References Cited

U.S. PATENT DOCUMENTS 3,855,122 12/1974 Bourganel .
4,207,182 6/1980 Marze .
4,976,859 12/1990 Wechs .
5,028,337 7/1991 Linder et al. .................. 210/500.27

FOREIGN PATENT DOCUMENTS 0086235 4/1986 European Pat. Off. .
0182506 5/1986 European Pat. Off. .
0228072 7/1987 European Pat. Off. .
0261734 3/1988 European Pat. Off. .
0337626 10/1989 European Pat. Off. .
0361085 4/1990 European Pat. Off. .
3149976 6/1983 Fed. Rep. of Germany .
3814759 11/1989 Fed. Rep. of Germany .
3814760 11/1989 Fed. Rep. of Germany .
61-249504 11/1986 Japan .
62-49912 3/1987 Japan .
1616935 12/1990 U.S.S.R. .

*Primary Examiner*—Frank Sever
*Attorney, Agent, or Firm*—Oliff & Berridge

[57] ABSTRACT

A synthetic hydrophilic membrane, and method for manufacturing thereof, in the form of hollow fibers or flat membranes for dialysis and/or ultrafiltration, containing a mixture of polysulfone and sulfonated polysulfone, the mixture containing 65 to 95 wt.% sulfonated polysulfone, possibly as a salt of sulfonic acid, and 35 to 5 wt.% unsulfonated polysulfone. Preferably, up to 12 wt.% water-soluble polymers, based on the total mixture, are added to the mixture of polysulfone and sulfonated polysulfone before formation of the membrane.

21 Claims, 3 Drawing Sheets

SYNTHETIC HYDROPHILIC MEMBRANES AND METHOD FOR THEIR MANUFACTURE

FIELD OF THE INVENTION

The invention relates to hydrophilic membranes in the form of hollow fibers or flat membranes for dialysis and/or ultrafiltration, containing a mixture of polysulfone and sulfonated polysulfone.

BACKGROUND OF THE INVENTION

Synthetic membranes and separating processes based on them have been known for a long time. In addition to classical areas of application, for example desalination of seawater by reverse osmosis or ultrafiltration of processing water from electrodip painting to recover paint, membrane processes are becoming increasingly important in the areas of food technology, medicine, and pharmaceuticals. In the latter cases, membrane separating processes have the great advantage that the materials to be separated are not subjected to thermal stress or even damaged.

An important prerequisite for the applicability of membranes in these areas is often that the membranes can be sterilized. For reasons related to safety and ecology, among others, steam sterilization is preferred over chemical sterilization (e.g., using ethylene oxide, or radiation sterilization, especially by gamma irradiation).

Steam sterilization is normally performed by treating the membrane or membrane system for approximately ½ hour with hot steam at temperatures greater than 110° C. The criterion of steam sterilizability therefore limits the number of potential membrane materials considerably. Thus, for example membranes made of polyacrylonitrile basically cannot be steam-sterilized because exceeding the glass temperature of the polymer results in irreversible damage to the material or membrane. Hydrolysis-sensitive polymers (e.g., certain polycarbonates and polyamides) likewise cannot withstand hot steam sterilization undamaged.

Steam-sterilizable materials made of polyetherimides, polysulfones, or polyvinylidine fluoride are known. A major disadvantage of these membranes lies in the hydrophobic nature of the membrane material, which prevents spontaneous wetting with aqueous media. Consequently, the membrane must either be prevented from drying completely or it must be treated before drying with a hydrophilizing agent, glycerin for example.

Hydrophilic membranes are characterized by the fact that they are wettable with water. A measure of wettability is the edge angle which a water drop forms with respect to the surface of the membrane. In hydrophilic materials, this edge angle is always less than 90°. The wetting of a dialysis membrane can also be detected by the fact that a drop of water applied to the surface of the membrane penetrates the membrane after a short time.

Another serious disadvantage of hydrophobic materials is that the materials often possess a powerful unspecific adsorption capability. Therefore, when hydrophobic membranes are used, rapid, firmly adhesive application of the membrane surface often takes place, preferably with higher-molecular-weight solvent components. This phenomenon, known as fouling, results in rapid deterioration of membrane permeability. Subsequent treatment of the membrane with a hydrophilizing agent cannot prevent fouling effectively.

Hydrophilic membranes which do not suffer from the above disadvantages have been proposed. For example, it is proposed in DE-OS 3,149,976 that a polymerizate mixture be used to manufacture a hydrophilic membrane, said mixture containing, in addition to polysulfone or polyamide, at least 15 weight percent polyvinylpyrrolidone. The use of polyethylene glycol in amounts of 44 to 70 weight percent, based on the polymer solution, is claimed in EP 0,228,072 for the hydrophilization of polyimide and polyether sulfone membranes.

However, the hydrophilization of membranes by the application of large quantities of water-soluble polymers has the disadvantage that the hydrophilicity of the membrane decreases steadily when it is used in aqueous media, since the water-soluble polymer is washed out. This can cause the membrane material to regain its original hydrophobic nature and exhibit the above-mentioned negative phenomena.

EP 0,261,734 describes the hydrophilization of polyetherimide membranes using polyvinylpyrrolidone. To prevent the washing-out effects, the polyvinylpyrrolidone is cross-linked in the non-swollen state. The method of manufacturing the membrane is very tedious, and therefore, cost-intensive, since the solvent and precipitant must be removed from the membrane after precipitation and before wetting, without removing the polyvinylpyrrolidone. It is only at this point that the polyvinylpyrrolidone is cross-linked by the application of high temperature or radiation, or chemically by means of isocyanates, whose residues absolutely must be removed completely before use when the membrane is to be employed in the food or medical area.

The disadvantages described above can be avoided by using hydrophilic, yet water-insoluble, polymers to make the membrane. Thus, in a number of patents, e.g. EP-0 182,506 and U.S. Pat. No. 3,855,122, manufacture of membranes from sulfonated polymers is claimed. However, the disclosed methods in these patents are only suitable for making flat membranes. They have a high salt retention capability and are used primarily for reverse osmosis.

U.S. Pat. No. 4,207,182 and two Japanese disclosure documents (JP-OS 61-249,504 and JP-OS 62-49,912) disclose another way to make hydrophilic membranes. According to these publications, hydrophilic membranes for ultrafiltration of aqueous solutions can be prepared advantageously from mixtures of sulfonated and non-sulfonated polysulfone.

The essential goal of the invention described in U.S. Pat. No. 4,207,182 is the use of highly concentrated polymer solutions to make membranes that are nevertheless characterized by high hydraulic permeability. This is accomplished by using polymer mixtures, with the quantity of sulfonated polysulfone based on the total polymer mixture of non-sulfonated and sulfonated polysulfone, being between 10 and 30 weight percent.

However, high hydraulic permeability is not advantageous for all applications. A high hydraulic permeability in dialysis results in back filtration and hence contamination of the liquid to be dialyzed by undesirable substances from the dialyzate.

As indicated by the examples in U.S. Pat. No. 4,207,182, the membranes according to the invention are also characterized by high screening coefficients for dextran with a molecular weight of 110,000 daltons.

Because of the high hydraulic permeability and the resulting high permeability to macromolecular substances with a molecular weight in excess of 100,000 daltons, the membranes that result from the claimed polymer mixtures are unsuitable for hemodialysis. This is all the more true when we consider that the dialytic permeability of the membranes manufactured in accordance with U.S. Pat. No. 4,207,182 is comparatively low.

SUMMARY OF THE INVENTION

A goal of the present invention is therefore to provide a synthetic, steam-sterilizable membrane which is permanently hydrophilic, and is preferably, but not exclusively, suitable for use in dialysis because of its separating abilities.

Another goal of the present invention is producing membranes marked by very good blood compatibility, in other words low thrombogenicity and low activation of the complement system, and therefore, especially suitable for use in blood purification.

Blood compatibility (biocompatibility) is evaluated after the material has been in contact with human blood for three hours. The factors used as criteria for biocompatibility are the number of platelets in the blood (platelet count), formation of the thrombin-antithrombin-complex (TAT), and the substance C5a which appears when the complement system is activated. TAT and C5a are detected using commercial assays as specified by the manufacturer, and the number of platelets in the blood is determined with a conventional platelet counter. A material is considered to be especially blood compatible when the platelet number differs slightly from the initial value (100%) and when the amount of TAT and C5a formed is low.

Another goal of the present invention is to provide a method for manufacturing membranes having the above properties.

To achieve these goals, comprehensive tests were performed based on polymer mixtures of polysulfone and sulfonated polysulfone. Surprisingly, polymer mixtures containing more than 60 weight percent sulfonated polysulfone, based on the total polysulfone content, were found to be especially blood-compatible.

A further goal of the invention is to provide a synthetic steam-sterilizable and biocompatible membrane for dialysis and/or ultrafiltration, preferably, to produce a dialysis membrane of this kind with a relatively high screening coefficient for substances with molecular weights up to approximately 20,000 daltons and a screening coefficient which is as low as possible for substances with molecular weights of more than approximately 50,000 daltons.

The invention provides for a synthetic hydrophilic membrane in the form of hollow fibers or flat membranes for dialysis and/or ultrafiltration, containing a mixture of polysulfone and sulfonated polysulfone, characterized by the mixture containing 65 to 95 wt.% sulfonated polysulfone, possibly as a salt of sulfonic acid, and 35 to 5 wt.% unsulfonated polysulfone.

BRIEF DESCRIPTION OF THE DRAWINGS

FIG. 1 shows a fraction of the surface of the inside wall at an enlargement of 10,000:1.

FIG. 2 shows the fraction of the surface in the middle of the wall at an enlargement of 50,000:1.

FIG. 3 again shows a fraction of the surface of an inside wall at an enlargement of 10,500:1.

DETAILED DESCRIPTION OF PREFERRED EMBODIMENTS

Figure 1:
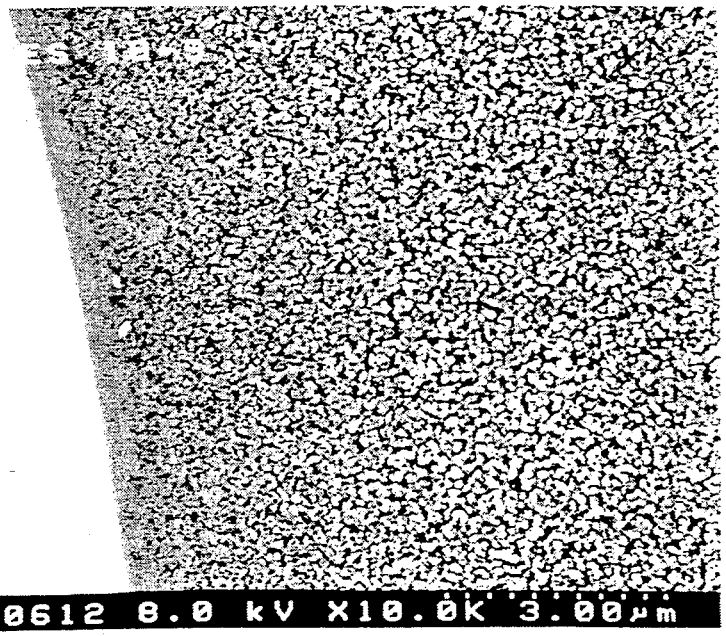
FIGS. 1 to 3 show scanning electron microscope pictures of membranes according to the invention.

To make the membranes according to the invention, a polymer solution is used that contains a mixture of polysulfone and sulfonated polysulfone. The polymers can be mixed in solid form as a mixture of powder or granules and then dissolved jointly, or they can be made by mixing polymers that have been dissolved separately beforehand. The polymer solution can be clear or cloudy at processing temperature.

Preferably up to 12 wt.% water-soluble polymers, based on the total mixture, are added to the mixture of polysulfone and sulfonated polysulfone before the membrane is formed. This supplement serves to improve the processability of the solution and does not contribute to hydrophilization because of the large content of sulfonated polysulfone.

The polysulfones are mainly polyether sulfones, preferably polyether sulfones which contain as a structural element, a group with the formula:

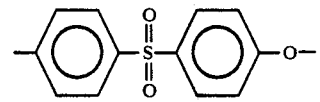

In one embodiment of the invention, the sulfonated sulfones are essentially sulfonated polyether sulfones, preferably those sulfonated polyether sulfones that have as a structural element, a group with the formula:

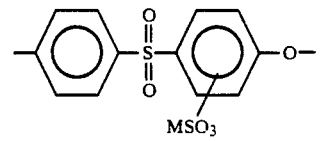

where M=H, Li, Na, K, NH$_4$, ½ Mg, ½ Ca.

The degree of sulfonation of the sulfonated polysulfone is between 3 mol.% and 30 mol.%, preferably between 5 and 25 mol.%. Hence, the degree of sulfonation is the ratio of the sulfonated structural units to all the structural units in the sulfonated polysulfone and can be expressed in mol.% or as a mole fraction.

In an embodiment of the invention, the synthetic hydrophilic dialysis membrane is characterized by the membrane essentially having a fine-pored structure made up of spherical aggregates or in the form of a porous network, with no caverns.

The term "caverns" refers to cavities in the membrane structure which are very large by comparison with a normal pore diameter. By suitable selection of precipitation conditions, formation of caverns that impede the mechanical stability of the membrane can be prevented.

The subject of the invention is also a method for manufacturing a membrane characterized by a mixture of 35 to 5 wt.% polysulfone and 65 to 95 wt.% sulfonated polysulfone, possibly as a sulfonic acid salt, being dissolved in DMF and/or DMAc and/or DMSO and/or NMP, possibly with up to 12 wt.% water-soluble polymer, shaped and precipitated as a membrane using a precipitant.

The following can be used as precipitants: non-solvents, possibly mixed with other non-solvents, and/or one or more solvents in amounts such that a pure polymer mixture does not dissolve in it to a significant degree.

Preferably, the solution is shaped in a hollow fiber nozzle and the cavity of the hollow fiber is formed by a mixture of the solvent and one or more non-solvents or by means of nonreacting gases or by means of aerosols.

In an embodiment of the method according to the invention, the precipitant for precipitating membranes on the outside and the precipitant for forming the interior cavity have different compositions. The temperature of the spinning solution or the precipitant is no higher than 60° C. and is preferably no higher than 40° C. To determine the properties of the membrane, all of the methods of measurement described below are used.

The membranes according to the invention are characterized by a relatively high screening coefficient for substances with average molecular weights up to approximately 20,000 daltons and a low screening coefficient, at least less then 0.1, for substances with average molecular weights of more than approximately 50,000 daltons. The screening coefficient (SK) of a substance indicates the degree to which the substance passes through the membrane. The screening coefficient is calculated as a quotient of the concentrations of the test substance in the filtrate (CF) and in the concentrate (CK):

$$SK = CF/CK \qquad (1)$$

In particular, cytochrome C with a molecular weight of approximately 13,000 daltons and bovine serum albumin (BSA) with a molecular weight of approximately 68,000 daltons are suitable as test substances for membranes according to the invention.

To determine the screening coefficients of cytochrome C and albumin, an aqueous phosphate-buffered sodium chloride solution (0.85 wt.% NaCl) is used, which, in addition to 0.01 wt.% cytochrome C and 5.0 wt.% BSA, also contains 0.003 wt.% sodium dithionite. These concentrations of cytochrome C and albumin are used as CK in Formula (1) to calculate the screening coefficients. The values for CF are determined in a normal ultrafiltration experiment (37° C., 0.2 bar) using the described solution from the filtrate. During the measurement of the screening coefficient on hollow fibers, 200 ml of test solution per minute per square meter of membrane surface was pumped into the hollow fiber under the stated conditions.

Another method for investigating the hydraulic permeability of a membrane is based on the use of an aqueous mixture of several dextrans with different molecular weights. The test solution in this case possesses a very broad molecular weight distribution, which in some cases has advantages over testing with individual substances. The dextran solution used in Example 1 is composed of the following:

| Substance | Amount |
| --- | --- |
| Dextran 4.000-6.000 | 3.85 g |
| Dextran 9.400 | 3.85 g |
| Dextran 18.400 | 4.21 g |
| Dextran 40.000 | 8.09 g |
| Water | 1,980.00 g |

The numerical values given for the dextrans, according to the manufacturer, characterize the average molecular weight of the material in question. After the ultrafiltration experiment was performed, simultaneously collected samples of the concentrate and retentate are investigated using gel permeation chromatography (GPC). The concentrations required to calculate the screen coefficient are taken from the chromatogram in the form of peak heights for elution volume, which correspond to the desired molecular weight. The GPC was calibrated with the individual substances listed.

The dialytic permeability DL describes the passage of a substance through the membrane under the driving force of a concentration gradient. To measure the dialytic permeability, the membrane is brought into contact on one side with an aqueous solution of the test substance and on the other side with pure water. The DL can be calculated as follows from solvent volume V, membrane area A, contact time t, and the concentrations of the test substances before (CO) and after (Ct) dialysis using the following formula:

$$DL = [V/(A * t)] * \ln (CO/Ct) \qquad (2)$$

Dialysis is performed at 37° C with a solution of 10 mmol creatinine and 0.074 mmol vitamin B12 in 1,000 ml of water. The concentrations of the test substances can also be determined easily using photometry. Before the dialytic permeability is determined, the entire pore volume of the membrane to be tested is filled with liquid. Advantageously, a UFR measurement is performed on the membrane in question before dialysis. The membrane is not allowed to dry out before dialysis.

To characterize the hydraulic permeability of a membrane, its ultrafiltration rate (UFR) is measured, which shows the amount of water per unit time per membrane area which will penetrate the membrane at a certain pressure.

The membrane area is defined as the outer surface of a membrane in contact with the test solution. In particular, the walls that delimit the pores in the membrane are not counted as part of the membrane surface because they are on the inner surface. In hollow fibers which have an internal flow (through the lumen), the membrane area is the product of the length and circumference of the lumen in contact with the test solution.

The invention will now be described in greater detail with reference to the following examples.

Unless stated to the contrary, a polyether sulfone (PES=Victrex, Type 5200 made by ICI) was used as the non-sulfonated component; the sulfonated polyether sulfone (SPES) obtained from the above-mentioned polyether sulfone by sulfonation in accordance with DE-OS 3,814,760 was used as the sulfonated material.

In the examples, the UFR is expressed in the following dimension:

$$ml/(m^2 \cdot h \cdot mmHg).$$

EXAMPLE 1

In a thermostatted round-bottom flask with a stirrer, a powder mixture of 72 g PES and 168 g SPES was dissolved at 70° C. with vigorous agitation in 740 g dimethylsulfoxide (DMSO) to which 30 g of glycerin had been added. As the SPES, a material was used having a degree of substitution of DS=7.5%, present in the form of the acid (SO$_3$H$^-$). The polymer solution was degassed by applying a vacuum at 40° C. The viscosity of the solution was then 12.1 Pa s at a shearing rate of $D=10 \, s^{-1}$ and 20° C. To produce hollow fibers, the polymer solution was extruded through the annular gap of a nozzle heated to 40° C. Through the interior of the nozzle, a mixture of 50 wt.% glycerin, 10 wt.% water, and 40 wt.% DMSO was simultaneously pumped. The nozzle was immersed in a precipitation bath liquid composed of 70 wt.% DMSO and 30 wt.% water, at a temperature of 40° C. The hollow fiber was pulled off from the nozzle at a rate of 20 m/min and fed through a precipitation bath with a thread travel distance of 180 cm. Then the hollow fiber passed through a bath 10 meters long, filled with water (temperature=20° C.). The hollow fiber thus produced was rinsed intensely to remove the solvent residue, after treated for 1 minute with a mixture of 20 wt.% glycerin in water at 20° C., and then dried at room temperature. It should be mentioned at this juncture that aftertreatment serves exclusively to improve handling ability during the following test-bundle production process, and not during hydrophilization. Even without glycerin treatment, the material was wettable. The hollow fiber had an internal diameter of approximately 230 μ and a wall thickness of 36 μ. At 37° C., the hydraulic permeability (UFR) for water was 69 ml/(m²·h·mmHg). The screening coefficient determined with a dextran mixture for a molecular weight of approximately 18,400 daltons was 0.65.

Scanning electron microscope (REM) pictures of the hollow fiber are shown in FIG. 1.

EXAMPLE 2

In a mixing vessel at room temperature, 50 g of polyvinylpyrrolidone (PVP K30 made by the BASF Corporation) were dissolved in 710 g of DMSO. After the solution had been heated to 70° C., the powder mixture was added in batches and dissolved while stirring, said mixture consisting of 168 g of SPES (DS=7.5%) and 72 g PES (the PES:SPES ratio=30:70). The solution has a viscosity of 7.9 Pa s ($D=5 \, s^{-1}$, T=40° C.). As described in Example 1, after degassing, hollow fibers were made from the polymer solution. The resultant membrane possessed the following properties:

| | |
|---|---|
| Average wall thickness | = 33 μ |
| UFR (water, 37° C.) | = 27 ml/(m² · h · mmHg) |
| SK (cytochrome C) | = 0.58 |
| SK (albumin) | = 0.00 |
| DL (vitamin B12) | = 11.8 · 10⁻³ cm/min |
| DL (creatinine) | = 71.4 · 10⁻³ cm/min |

Figure 2:

The REM picture of this membrane (FIG. 2) clearly shows a spherical structure.

EXAMPLE 3

Comparative example

In contrast to Example 2, a polymer solution was used which, in addition to 5 wt.% PVP K30 and 71 wt.% DMSO, contained only non-sulfonated PES (24 wt.%). The resultant membrane had the following properties:

| | |
|---|---|
| Average wall thickness | = 43 μ |
| UFR (water, 37° C.) | = 28 ml/(m² · h · mmHg) |
| SK (cytochrome C) | = 0.26 |
| SK (albumin) | = 0.00 |
| DL (vitamin B12) | = 1.3 · 10⁻³ cm/min |
| DL (creatinine) | = 4.7 · 10⁻³ cm/min |

The screening coefficient for cytochrome C and the dialytic permeability were much poorer by comparison with Example 2. This was also the case when the different wall thicknesses were taken into account.

EXAMPLE 4

Comparative example

In contrast to Example 2, a polymer solution was used that contained 16.8 wt.% PES, 7.2 wt.% SPES (DS=7.5%), 5 wt.% PVP K30, and 71 wt% DMSO. The resultant membrane with a PES:SPES ratio of 70:30 had the following properties:

| | |
|---|---|
| Average wall thickness | = 42 μ |
| UFR (water, 37° C.) | = 34 ml/(m² · h · mmHg) |
| SK (cytochrome C) | = 0.41 |
| SK (albumin) | = 0.00 |
| DL (vitamin B12) | = 7.8 · 10⁻³ cm/min |
| DL (creatinine) | = 38.3 · 10⁻³ cm/min |

In this case also, the separating properties were much poorer than in Example 2.

EXAMPLE 5

As described in Example 2, a membrane was prepared from a polymer solution of 6.0 wt.% PES, 14.0 wt.% SPES, 5 wt.% PVP K30, and 75 wt.% DMSO, using an internal filler of 60 wt.% DMSO, 10 wt.% water, and 30 wt.% glycerin. A pulloff rate from the nozzle of 30 m/min was selected. After 20 minutes of hot steam sterilization at 121° C., the resultant membrane had the following properties:

| | |
|---|---|
| Average wall thickness | = 38 μ |
| UFR (water, 37° C.) | = 148 ml/(m² · h · mmHg) |
| SK (cytochrome C) | = 0.8 |
| SK (albumin) | = 0.09 |
| DL (vitamin B12) | = 20.3 · 10⁻³ cm/min |
| DL (creatinine) | = 103.3 · 10⁻³ cm/min |

Figure 3:
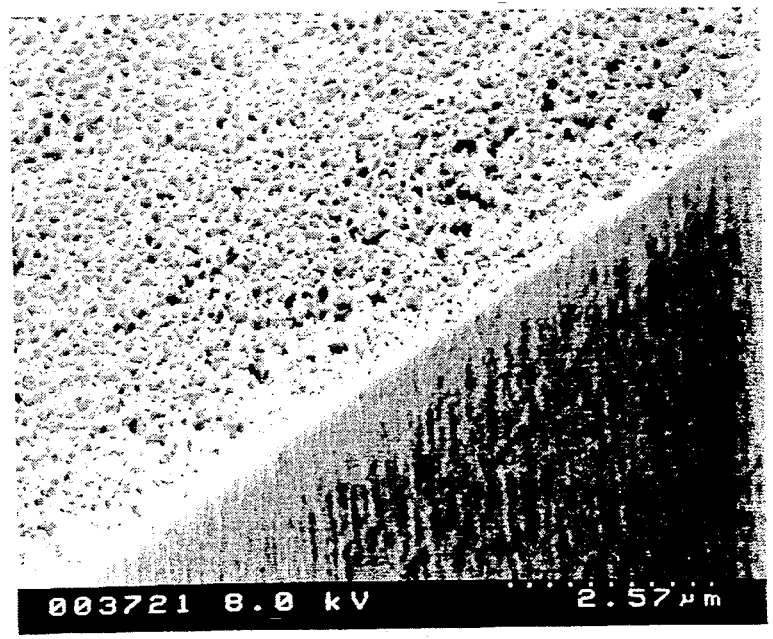

Hot steam sterilization did not result in any deterioration of the hydraulic and dialytic membrane properties. The REM picture of the membrane (FIG. 3) showed a reticulate structure.

EXAMPLE 6

As described in example 2, a membrane was made from a polymer solution of 16.2 wt.% SPES (DS=7.5%), 1.8 wt.% PES (PES:SPES=10 : 90), 10 wt.% PVP K30 and 72 wt.% DMSO using an internal filler of 65 wt.% DMSO and 35 wt.% water. The following properties were measured on this membrane.

| | |
|---|---|
| Average wall thickness | = 33 μ |
| UFR (water, 37° C.) | = 28 ml/(m² · h · mmHg) |
| SK (cytochrome C) | = 0.1 |
| SK (albumin) | = 0.0 |
| DL (vitamin B12) | = 8.5 · 10⁻³ cm/min |
| DL (creatinine) | = 127.0 · 10⁻³ cm/min |

The results show that addition of PVP to the polymer solution does not really act as a "pore former" and also that the location of the separation curve obtained from the screening coefficients can be shifted within wide limits over the mixing ratio of PES:SPES.

EXAMPLE 7

According to Example 1, a membrane was produced from a polymer solution containing 18.2 wt.% SPES (DS=20.5%), 7.8 wt.% PES (PES:SPES=30:70), and 74 wt.% DMSO. A mixture of 60 wt.% water and 40 wt.% DMSO was used as the internal filler. The resultant membrane was characterized by high diffusive permeability with a low separation limit:

| | |
|---|---|
| Average wall thickness | = 30 μ |
| UFR (water, 37° C.) | = 60 ml/(m² · h · mmHg) |
| SK (cytochrome C) | = 0.0 |
| SK (albumin) | = 0.0 |
| DL (vitamin B12) | = $17.0 \cdot 10^{-3}$ cm/min |
| DL (creatinine) | > $150 \cdot 10^{-3}$ cm/min |

EXAMPLE 8

To produce flat membranes, a polymer solution analogous to Example 1, whose concentration in PES and SPES totals 20 wt.%, was applied to a glass plate 300 μ thick. The polymers were precipitated by dipping the glass plate and polymer film into water at 20° C. Following spontaneous separation of the membrane from the glass plate, the membrane was rinsed intensely under running water to get rid of the solvent residues. Then the membrane was dried without further treatment at room temperature. For various PES:SPES mixture ratios in the range of SPES≦70 wt.% and DS(SPES)=15%, the following biocompatibility parameters were determined:

TABLE 1

| Weight Ratio, PES:SPES | DS (SPES) (%) | Platelet Count (%) | TAT (ng/ml) | C5a (ng/ml) |
|---|---|---|---|---|
| 90:5 | 15 | 79 | 75 | 99 |
| 70:30 | 15 | 74 | 90 | 25 |
| 30:70 | 15 | 87 | 38 | <10 |
| Blank | — | 88 | 24 | <10 |

The PES/SPES mixtures with SPES components within the claimed range offer much better values for C5a and/or TAT than mixtures outside the claimed range.

EXAMPLE 9

Biocompatibility tests on flat membranes prepared by analogy with Example 8 showed the following values for various mixing ratios of PES:SPES and different degrees of substitution of SPES:

TABLE 2

| Weight Ratio, PES:SPES | DS (SPES) (%) | Platelet Count (%) | TAT (ng/ml) | C5a (ng/ml) |
|---|---|---|---|---|
| 30:70 | 12 | 75 | 45 | <10 |
| 20:80 | 12 | 78 | 53 | <10 |
| 10:90 | 12 | 75 | 52 | <10 |
| 20:80 | 16 | 77 | 36 | <10 |
| 20:80 | 4 | 75 | 29 | <10 |
| Blank | — | 88 | 13 | <10 |

All the materials in this example are characterized by outstanding blood compatibility.

What is claimed is:

1. A synthetic hydrophilic membrane in the form of hollow fibers or flat membranes, comprising a mixture within a single layer of polysulfone and sulfonated polysulfone, wherein the mixture comprises ranges providing properties for dialysis and/or ultrafiltration from about 65 to about 95 wt% sulfonated polysulfone and from about 5 to about 35 wt% unsulfonated polysulfone.

2. The synthetic hydrophilic membrane according to claim 1, wherein the sulfonated polysulfone is a salt of sulfonic acid.

3. The synthetic hydrophilic membrane according to claim 1, wherein up to about 12 wt.% water-soluble polymers, based on the total mixture weight, are added to the mixture of polysulfone and sulfonated polysulfone before membrane formation.

4. The synthetic hydrophilic membrane according to claim 1, wherein the polysulfones are essentially polyether sulfones.

5. The synthetic hydrophilic membrane according to claim 4, wherein the polyether sulfones contain a group having the following formula as a structural element:

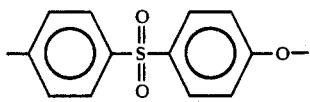

6. The synthetic hydrophilic membrane according to claim 1, wherein the sulfonated sulfones are essentially sulfonated polyether sulfones.

7. The synthetic hydrophilic membrane according to claim 6, wherein the sulfonated polyether sulfones contain a group having the following formula as a structural element:

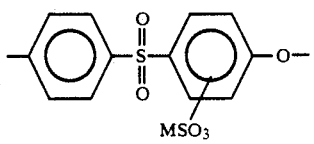

where M=H, Li, Na, K, NH₄, ½ Mg, ½ Ca.

8. The synthetic hydrophilic membrane according to claim 1, wherein the degree of sulfonation of the sulfonated polysulfone ranges from about 3 mol.% to about 30 mol.%.

9. The synthetic hydrophilic membrane according to claim 1, wherein the degree of sulfonation of the sulfonated polysulfone ranges from about 5 mol.% to about 25 mol.%.

10. The synthetic hydrophilic membrane according to claim 1, wherein the membrane has a fine-pored structure composed of spherical aggregates or in the form of a porous network, and contains no caverns.

11. A method for producing a membrane according to claim 1, comprising dissolving a mixture of about 35 to about 5 wt.% polysulfone and about 65 to about 95 wt.% sulfonated polysulfone in a solution comprising at least one solvent selected from the group DMF, DMAc, DMSO and NMP, and shaping and precipitating the solution as a membrane using one or more precipitants.

12. The method according to claim 11, wherein the mixture further comprises up to about 12 wt.% water-soluble polymers.

13. The method according to claim 11, further comprising shaping the solution in a hollow fiber nozzle and forming a cavity of the hollow fiber by means of a mixture of the at least one solvent and at least one non-solvent.

14. The method according to claim 11, further comprising shaping the solution in a hollow fiber nozzle and forming a cavity of the hollow fiber nozzle by means of non-reacting gases.

15. The method according to claim 11, further comprising shaping the solution in a hollow fiber nozzle and forming a cavity of the hollow fiber by aerosol means.

16. The method according to claim 11, wherein the precipitant comprises a first precipitant for precipitating an outside membrane, and a second precipitant for forming an inner cavity, said first and second precipitants having different compositions.

17. The method according to claim 11, wherein a temperature of either the solution or at least one of the first precipitant and second precipitant is no higher than 60° C.

18. The method according to claim 17, wherein the temperature is no higher than 40° C.

19. The synthetic hydrophilic membrane according to claim 1, wherein said membrane consists essentially of said mixture.

20. The synthetic hydrophilic membrane according to claim 1, wherein said membrane is a one-layered membrane.

21. The synthetic hydrophilic membrane according to claim 1, wherein said membrane is non-coated.

* * * * *